United States Patent [19]

Jüntgen et al.

[11] Patent Number: 4,921,826

[45] Date of Patent: May 1, 1990

[54] PROCESS FOR PRODUCING AN ACTIVE CARBON CATALYST

[75] Inventors: Harald Jüntgen; Karl Knoblauch; Ekkehard Richter; Helmut Kühl, all of Essen, Fed. Rep. of Germany

[73] Assignee: Bergwerksverband GmbH, Essen, Fed. Rep. of Germany

[21] Appl. No.: 294,490

[22] PCT Filed: May 22, 1987

[86] PCT No.: PCT/EP87/00269

§ 371 Date: Dec. 7, 1988

§ 102(e) Date: Dec. 7, 1988

[87] PCT Pub. No.: WO87/07852

PCT Pub. Date: Dec. 30, 1987

[30] Foreign Application Priority Data

Jun. 18, 1986 [DE] Fed. Rep. of Germany ....... 3620425

[51] Int. Cl.$^5$ ...................... B01J 21/18; B01D 53/36
[52] U.S. Cl. .................................... 502/180; 423/239; 423/244; 423/460; 502/217; 502/417
[58] Field of Search ...................... 502/180, 217, 417; 423/260

[56] References Cited

U.S. PATENT DOCUMENTS 4,210,628  7/1980  Ninomiya et al. ................. 423/239

FOREIGN PATENT DOCUMENTS

| 3327592 | 2/1985 | Fed. Rep. of Germany . |
| 3335499 | 4/1985 | Fed. Rep. of Germany . |
| 3438141 | 4/1986 | Fed. Rep. of Germany . |
| 3440808 | 5/1986 | Fed. Rep. of Germany . |
| 07852 | 12/1987 | PCT Int'l Appl. . |

*Primary Examiner*—Paul E. Konopka
*Attorney, Agent, or Firm*—Herbert Dubno

[57] ABSTRACT

Process for producing an active catalyst by ammonia treatment of active carbons at high temperatures, in which an active carbon/active coke is impregnated with an aqueous solution of ammonium sulphate, which can be reacted with sulphuric acid, is dried at 120° C. and is then heated in an inert gas stream to temperatures above 350° C. Application of the active carbon catalyst as a reducing and/or oxidizing catalyst, for example for NO$_x$ elimination from exhaust gases using ammonia.

2 Claims, No Drawings

PROCESS FOR PRODUCING AN ACTIVE CARBON CATALYST

CROSS REFERENCE TO RELATED APPLICATIONS

This application is a national phase of PCT/EP 87/00269 filed 22 May 1987 and based, in turn, on German national application P 36 20 425.0 under the International Convention.

FIELD OF THE INVENTION

The invention relates to a process for producing an active carbon catalyst.

BACKGROUND OF THE INVENTION

It is known to improve the catalytic activity of active carbon by treatment with ammonia at high temperatures. So for instance H. P. BÖHM (Fuel, 1984, Vol. 63, pages 1061–1063) has found that the treatment of active carbon with ammonia or prussic acid at temperatures above 600° C. increases the catalytic activity of the active carbon in the case of oxidation reactions in the acqueous phase. However, these active carbons have the disadvantage that they are deactivated very quickly.

From U.S. Pat. No. 4 210 628 a process for the removal of nitrogen oxides from exhaust gases with the aid of ammonia is known, wherein active carbon is used as a catalyst. In the presence of sulfur oxides in the exhaust gases, on the catalyst ammonium sulfate and sulfuric acid are formed. The deactivated catalyst is therefore regenerated, e.g. by heating to temperatures between 350° and 800° C. in a stream of inert gas. The regenerated catalyst shows an improved catalytic activity. A pretreatment of the catalyst prior to being used in the process for the elimination of nitrogen oxides is not disclosed.

OBJECT OF THE INVENTION

It is the object of the invention to produce an active carbon catalyst with a low degree of deactivation.

SUMMARY OF THE INVENTION

This object is attained according to the invention by impregnating active carbon or active coke is treated with an aqueous solution of ammonium sulfate, dried at 120° C. and subsequently heated to temperatures above 350° C. in a stream of inert gas, until no $SO_2$ development occurs.

In accordance with a further development, the aqueous solution of ammonium sulfate is treated with sulfuric acid.

Through a repetition of the described treatment, the catalytic activity can be enhanced even further. All active carbons available in commerce and also non-activated carbon products (active coke) can be used.

The so-produced catalysts are advantageously suited for all catalytic reduction-and oxidation reactions occuring in the presence of active carbon, such as the reduction of nitrogen oxides with $NH_3$, the oxidation of $H_2S$ with atmospheric oxygen and steam to $H_2SO_4$.

It is particularly advantageous to use the produced catalysts for the removal of nitrogen oxides from exhaust gases with the aid of ammonia, according to the following overall equation:

$$4NO + 4NH_3 + O_2 \rightarrow 4N_2 + 6H_2O$$

In this reaction the active carbon catalyst produced according to the invention functions as a reduction catalyst as well as an oxidation catalyst. The first step is an oxidation of NO with atmospheric oxygen into $NO_2$ takes place, which then, together with the further NO is reduced by ammonia to nitrogen and water.

With the process of the invention it has become possible to incorporate active nitrogen into the active carbon catalyst, which cannot be removed, even though the catalyst is heated at 900° C.

If the incorporation of the nitrogen into the active carbon takes place according to known state of the art ammonia treatment, the active carbon deactivates during the catalytic $NO_x$-reduction. After approx. 5–7 hours of testing, in a comparison test it was not possible to establish a difference between an active carbon treated with ammonia and an untreated active carbon.

SPECIFIC EXAMPLE

Example 1

An active carbon with a specific surface according to BET (DIN 66 131) of 800 m²/g is impregnated at room temperature with a saturated ammonium sulfate solution, treated with 5 to 15% by weight sulfuric acid, dried overnight at 120° C. and subsequently heated at 420° C. in a stream of nitrogen. After 1.5 h, no further $SO_2$-development took place.

Example 2

An active carbon with a specific surface according to BET (DIN 66 131 of 1350 m²/g is impregnated at room temperature with a saturated ammonium sulfate solution which was treated with 10% by weight sulfuric acid, dried overnight at 120° C. and subsequently heated for 1.5 h at 420° C. in a stream of nitrogen.

Example 3

The active carbon of Example 1 is impregnated with a saturated solution of ammonium sulfate, dried at 120° C. and subsequently heated for 1.5 h at 420° C. in a stream of nitrogen. The treatment is performed two to four times.

Example 4

200 ml of the active carbon catalyst produced as in Examples 1 to 3 and the initial products are tested in a reactor with a clear width of 55 mm and a height of 400 mm for their catalytic activity with respect to NO-reduction with ammonia. The test temperatures range between 100° and 160° C. The initial concentrations of steam equal 10% by vol. and of sulfuric acid 5% by vol. The contact time is 6 sec. The NO-concentration equals 490 vpm and the $NH_3$-concentration 585 resp. 835 vpm. The results are shown in the table. The conversion of NO was established after 24 h. For the catalyst in Example 1 (15% by weight $H_2SO_4$-treatment), the catalytic activity was additionally established after 2 weeks of testing.

| 16872 Catalysts | $CoNH_3$ (vpm) | T (°C.) | $U_{NO}$ (%) | $NH_3/NO$ |
|---|---|---|---|---|
| Initial active carbon of Example 1 | 835 | 100 | 65 | 1.2 |
|  |  | 120 | 71 | 1.2 |
|  |  | 160 | 80 | 1.3 |
|  | 585 | 100 | 59 | — |
|  |  | 120 | 67 | 1.3 |

-continued

| 16872 Catalysts | CoNH₃ (vpm) | T (°C.) | U$_{NO}$ (%) | NH₃/NO |
|---|---|---|---|---|
|  |  | 160 | 71 | 1.2 |
| Catalyst of | 835 | 100 | 87 | 1.2 |
| Example 1 (5% |  | 120 | 93 | 1.1 |
| by weight H₂SO₄) |  | 130 | 95 | 1.1 |
|  | 585 | 100 | 80 | 1.2 |
| Catalyst of | 835 | 100 | 88 | 1.3 |
| Example 1 (15% |  | 120 | 95 | — |
| by weight H₂SO₄) |  | 130 | 99 | 1.1 |
|  | 585 | 100 | 81 | 1.2 |
|  |  | **100 | 82 | 1.1 |
| Initial active carbon of Example 2 | 835 | 100 | 41 | 1.2 |
| Catalyst of Example 2 (10% by weight H₂SO₄) | 835 | 100 | 70 | 1.1 |
| Catalyst of | 835 | 100 | 79 | 1.1 |
| Example 3 |  | 120 | 84 | 1.1 |
| (treated twice) |  | 160 | 92 | 1.1 |
| Catalyst of | 835 | 100 | 84 | 1.3 |
| Example 3 |  | 120 | 92 | 1.1 |
| (treated 4 times) |  | 150 | 98 | 1.1 |
|  | 585 | 100 | 81 | 1.2 |

CoNH₃ = Initial concentration of NH₃
U$_{NO}$ = NO conversion
NH₃/NO = the ratio of converted NH₃ mole to the converted NO mole
** = result of long-term test of 2 weeks It can be seen form the test results that an increase of the catalytic activity occurs, due to the pretreatment according to the invention. So for instance, the conversion of NO in the case of the initial active carbon of Example 1 at, for instance, a reaction temperature of 100° C., is increased from 65 (835 vpm NH₃), or 59% (585 vpm NH₃) to 87% or 80%.

In the case of the highly activated active carbon of Example 2, the conversion of NO increases with the same test conditions, from 41% to 70%. By repeating the pretreatment, a further increase of the NO-conversion to for instance 79% or 84% becomes possible (catalyst of Example 3). The active carbon catalysts did not show any deactivation, even after two weeks of testing.

We claim:

1. A process for the production of an active carbon catalyst by ammonia treatment at high temperatures, comprising the steps of: impregnating the active carbon or the active coke with an aqueous solution of ammonium sulfate; drying the impregnated active carbon or active coke at 120° C.; and subsequently heating the dried impregnated active carbon or active coke to temperatures above 350° C. in an inert-gas stream, until no SO₂-development occurs.

2. The process according to claim 1 wherein the aqueous solution of ammonium sulfate is first treated with sulfuric acid.

* * * * *